US012093259B2

(12) United States Patent
Bursik et al.

(10) Patent No.: US 12,093,259 B2
(45) Date of Patent: Sep. 17, 2024

(54) AD HOC DATA EXPLORATION TOOL

(71) Applicant: Target Brands, Inc., Minneapolis, MN (US)

(72) Inventors: Jeffrey Jacob Bursik, Farmington, MN (US); Debashis Ghosh, Minneapolis, MN (US); Matt Jesser, Minneapolis, MN (US); Robert James Koste, Brooklyn Park, MN (US); Jason Louer, Saint Paul, MN (US); Jayanthi Narayanan, Minneapolis, MN (US); Andrew Hangsleben, Saint Paul, MN (US); Arman Shah, Minneapolis, MN (US); Michael Jantscher, Minneapolis, MN (US); Sam Bloomquist, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 64 days.

(21) Appl. No.: 17/748,661

(22) Filed: May 19, 2022

(65) Prior Publication Data
US 2022/0350798 A1 Nov. 3, 2022

Related U.S. Application Data

(63) Continuation-in-part of application No. 16/988,243, filed on Aug. 7, 2020, now Pat. No. 11,675,814.

(60) Provisional application No. 63/190,683, filed on May 19, 2021.

(51) Int. Cl.
*G06F 16/2455* (2019.01)

(52) U.S. Cl.
CPC .................. *G06F 16/2455* (2019.01)

(58) Field of Classification Search
CPC .......... G06F 16/2455; G06F 16/24573; G06F 16/2465; G06F 16/248; G06F 16/26; G06F 16/283; G06F 16/24539
See application file for complete search history.

(56) References Cited

U.S. PATENT DOCUMENTS

| 6,704,726 B1 | 3/2004 | Amouroux |
| 9,304,663 B1 * | 4/2016 | Guo .................... G06F 11/3006 707/615 |
| 9,633,076 B1 | 4/2017 | Morton et al. |
| 10,255,699 B2 | 4/2019 | George et al. |

(Continued)

OTHER PUBLICATIONS

Alteryx1.

(Continued)

*Primary Examiner* — Yuk Ting Choi
(74) *Attorney, Agent, or Firm* — Merchant & Gould P.C.

(57) ABSTRACT

The disclosed application relates to a tool by which a user may create a cloud workspace that includes a data memory space, as well as a tool for automatically identifying ad-hoc analyses on that data. The solution allows a user to connect to data sources using SQL or GUI tools, combine data from different data sources, prepare and clean the data, mine the data for insights, and move that data into downstream reporting tools for visualization. The system is linked to a code repository to allow data scientists to execute code from the code repository in trial data spaces, investigate that data, and prepare more in-depth analytics for downstream reporting tools.

20 Claims, 11 Drawing Sheets

(56) References Cited

U.S. PATENT DOCUMENTS

| | | | |
|---|---|---|---|
| 11,106,734 B1* | 8/2021 | Batsakis | G06F 16/2282 709/204 |
| 2003/0009295 A1 | 1/2003 | Markowitz et al. | |
| 2007/0124374 A1* | 5/2007 | Arun | G06Q 10/10 709/204 |
| 2014/0013297 A1 | 1/2014 | Cook et al. | |
| 2015/0379429 A1 | 12/2015 | Lee et al. | |
| 2016/0085772 A1* | 3/2016 | Vermeulen | G06F 16/21 707/615 |
| 2017/0031986 A1 | 2/2017 | Li et al. | |
| 2018/0314745 A1* | 11/2018 | Filippi | G06F 16/164 707/615 |
| 2018/0329990 A1 | 11/2018 | Severn et al. | |
| 2019/0095478 A1 | 3/2019 | Tankersley et al. | |
| 2019/0391834 A1* | 12/2019 | Mullen | G06F 9/5005 707/615 |
| 2021/0056225 A1* | 2/2021 | Sislow | G06F 21/6227 707/615 |
| 2021/0209099 A1* | 7/2021 | Marsden | G06F 16/2465 707/703 |
| 2022/0292086 A1* | 9/2022 | Balasubramanian | G06F 16/285 709/204 |

OTHER PUBLICATIONS

Alteryx2—"Alteryx Designer—Experience the Thrill of Solving", https://www.alteryx.com; 7 Pages, 2020.

Alteryx3—"Alteryx Server—Analytics at Scale", https://www.alteryx.com; 6 Pages, 2020.

Alteryx4—"Alteryx Connect—Find All Your data", https://www.alteryx.com; 6 Pages, 2020.

Alteryx5—"Alteryx—Advanced Analytics"—https://www.alteryx.com; 4 Pages, 2020.

Chartio1—Where Teams Explore Data "Create powerful dashboards from your company's data and quickly discover Insights with Chartio", https://chartio.com, 10 Pages, Printed Mar. 2, 2020.

Chartio2—Software Advice "What can we help you find?", https://www.softwareadvice.com/bi/chartio-profile/, 6 Pages, Printed Mar. 2, 2020.

Chartio3—"Our Mission: make data accessible to anyone", https://chartio.com/product/, 9 Pages, Printed Mar. 2, 2020.

Chartio4—"Cloud Based Data Exploration, Charts and Interactive Dashboards—Martech Zone", https://martech.zone/chartio-dashboards/, 5 Pages, Printed Mar. 2, 2020.

Talia, Domenico et al., "Data Analysis in the Cloud—1st Edition—Models, Techniques and Applications", https://www.elsevier.com, 9 Pages, 2016.

Haas, Laura M. et al., Optimizing Queries across Diverse Data Sources, IBM Almaden Research Center, San Jose, California, 10 Pages, 1997.

Gaekwad, Nikhil, "Microsoft Power BI Blog—Announcing Dashboard Comments in Power BI: Your new hub to discuss data and collaborate with others", https://powerbi.microsoft.com; 21 Pages, Printed Mar. 2, 2020.

The Power BI Team (Microsoft), "Microsoft Power BI Blog—Sharing and Discovering Queries Using Power Query and Power BI", https://powerbi.microsoft.com; 13 Pages, Printed Mar. 2, 2020.

Tableau (Products)—"Data Everywhere—Tableau for everyone—Designed for the individual Scaled for the enterprise", https://www.tableau.com, 11 Pages, Printed Mar. 2, 2020.

Tableau—"What is Tableau? Uses and Applications", https://tableau.com, 10 Pages, 2020.

Tableau—"Industry-leading analytics for your customers", https//www.tableau.com/embedded-analytics, 13 Pages—Printed Mar. 2, 2020.

* cited by examiner

Services

| ID | Name | Owner | Type | Last Modified | Status | More Info | Restart | Kill |
|---|---|---|---|---|---|---|---|---|
| 60c097c0-5129-493c-a1d3-ba85b06bfc5a | Test 1 | z068843 | Jupyter Lab | Feb 15, 2021 21:18pm | ACTIVE | SHOW | ↻ | 🗑 |
| 0cf475c4-16fe-43d9-b270-b82779e0d9dc | Test 2 | z068843 | Jupyter Lab | Feb 15, 2021 21:19pm | ACTIVE | SHOW | ↻ | 🗑 |
| 1c628b78-eddd-4ca7-b35c-393ac0818d4f | Test 3 | z068843 | Jupyter Lab | Feb 15, 2021 21:19pm | ACTIVE | SHOW | ↻ | 🗑 |
| 64051d50-5d2e-4661-a58f-136181b9bea9 | Test 4 | z068843 | Jupyter Lab | Feb 15, 2021 21:20pm | ACTIVE | SHOW | ↻ | 🗑 |
| a3e24322-66d8-4520-a9eb-6e827debded7 | Test 1 | z068843 | RStudio | Feb 15, 2021 21:48pm | ACTIVE | SHOW | ↻ | 🗑 |
| cdd395a0-1135-4125-9f14-cd02a8fae1ee | Test 4 | z068843 | RStudio | Feb 15, 2021 21:49pm | ACTIVE | SHOW | ↻ | 🗑 |
| 71ebec19-84bd-49f8-afbb-eeab7a976e77 | Test 5 | z068843 | RStudio | Feb 15, 2021 21:55pm | ACTIVE | SHOW | ↻ | 🗑 |
| 7e13b0b4-12f8-4cb9-9a1e-49e5f6dc07b7d | Br4 | z004yzb | RStudio | Feb 15, 2021 22:02pm | ACTIVE | SHOW | ↻ | 🗑 |

☑ ACTIVE
☐ DELETED
☐ FAILED

FIG. 9

AD HOC DATA EXPLORATION TOOL

RELATED APPLICATIONS

This application claims priority to U.S. Provisional Patent Application No. 63/190,683, filed May 19, 2021, and is also a continuation-in-part of U.S. patent application Ser. No. 16/988,243, filed Aug. 7, 2020 which are incorporated by reference herein in their entirety.

BACKGROUND

Data scientists need to be able to obtain and perform investigations on data across any of a number of different data sources, using any of a number of otherwise undefined data relationships to detect previously-undetected relationships among data in an organization. However, other users (e.g., business analysts) often are required to review similar datasets for trend information (e.g., item sales trends, revenue trends, business condition trends, etc.). The types of analysis performed by these two groups is significantly different in terms of need. Business analysts will require the convenience of graphical analysis and graphical assistance in connecting to underlying databases, while data scientists will need the ability to easily access data and apply data science models (e.g., executing Python and/or R scripts on that data directly).

Currently, enterprise databases are ill-constructed to accomplish in-place analysis for both groups. Such databases, which may be constructed as SQL databases or distributed databases (e.g., in Hadoop), either require significant resources to gather data from a plurality of different nodes (in the case of distributed databases) or to merge particular tables that otherwise represent unrelated data. It takes a significant amount of computing resources, and/or user time to clean and organize data into something usable for analysis. Often end users do not wish to perform data analytics using enterprise-wide data when the effectiveness or direction of analysis remains unknown.

Accordingly, these different user groups will use a variety of different existing analysis tools. Data scientists will often generate interim data collections and execute analytic code against that data. Business analysts will use analysis tools to generate dashboards and/or reports; those tools allow end users to statically define connections to underlying data and define visualizations on that data based on available dimensions defined in the underlying data (e.g., existing data relationships), but are constrained as to the flexibility of analysis.

While such tools have proven valuable in generating graphical data analyses that may be used by an organization, they are often inconvenient for rapid assessment of enterprise data in an analysis setting, and exchange of data among data scientists and business analysts. Accordingly, improvements in flexibility of analysis are desirable.

SUMMARY

Generally, the present disclosure includes technology for exploring and mining data within a large organization.

In one embodiment, a data exploration tool is disclosed. The data exploration tool comprises: a data exploration interface including a query pane and a results pane, the query pane configured to receive a database query directed to a plurality of different underlying data sources, the results pane illustrating records returned from the plurality of different underlying data sources in response to the database query received from a user in the query pane; a containerized temporary storage space into which query results from the database queries are stored; and an analysis interface including a dimension selection panel configured to display each of the available dimensions included in the query results, each of the dimensions being selectable to be applied within a scorecard as one of (1) a data column or (2) a data filter.

In a second embodiment, a method of analyzing enterprise data is disclosed. The method comprises: receiving a database query from a user in a query pane of a data exploration interface of a data exploration tool, the database query being a query of a plurality of different underlying data sources; storing records received in response to the database query in a containerized temporary storage space; displaying the records received in response to the database query in a results pane of the data exploration interface; and receiving, in an analysis interface, a selection of an available dimension presented in a dimension selection panel to be included within a scorecard as one of (1) a data column or (2) a data filter.

In a third embodiment, a data exploration environment is disclosed. The data exploration environment comprises: a code repository; a data exploration tool instantiable within a cloud-based container, the data exploration tool being communicatively linked to the code repository such that a temporary storage space within the cloud-based container is accessible to code executable from the code repository, the data exploration tool further comprising: a data exploration interface including a query pane and a results pane, the query pane configured to receive a database query directed to a plurality of different underlying data sources, the results pane illustrating records returned from the plurality of different underlying data sources in response to the database query received from a user in the query pane; an analysis interface including a dimension selection panel configured to display each of the available dimensions included in the query results, each of the dimensions being selectable to be applied within a scorecard as one of (1) a data column or (2) a data filter.

In a fourth embodiment, a data exploration system is disclosed. The data exploration system comprises: a data exploration tool usable to instantiate a containerized temporary storage space and link to one or more code repositories storing executable code including one or more data queries, the temporary storage space being configured to store query results from the data queries, the data exploration tool including one or more data exploration services usable to manipulate the query results in the temporary storage space; and a service application monitoring execution of the code within the temporary storage space, the service application providing a user interface via the data exploration tool to view, interrupt, and initiate execution of the code.

In a fifth embodiment, a method of exploring data is disclosed. The method of exploring data obtained from queries of a plurality of data sources, the method comprising: instantiating a containerized temporary storage space; linking the containerized temporary storage space to one or more code repositories storing executable code that includes one or more data queries of the plurality of data sources; via a data exploration tool, utilizing one or more data exploration services to manipulate query results within the temporary storage space, the data exploration tool providing one or more analysis user interfaces; accessing a service application that monitors execution of the executable code to display a service user interface presenting code execution status of the executable code and including one or more code execution modification options; and in response to a selection of one of the one or more code execution modification options, modifying execution of the executable code via the service application.

In a sixth embodiment, a data exploration system is disclosed. The data exploration system comprises: a data exploration tool usable to instantiate a containerized temporary storage space and link to one or more code repositories storing executable code including one or more data queries, the temporary storage space being configured to store query results from the data queries, the data exploration tool including one or more data exploration services usable to manipulate the query results in the temporary storage space; a service application monitoring execution of the code within the temporary storage space, the service application providing a user interface via the data exploration tool to view, interrupt, and initiate execution of the code; and an analysis interface including one or more administrative options associated with each of the one or more data exploration services, wherein the one or more administrative options includes accessing log files associated with the one or more data exploration services.

BRIEF DESCRIPTION OF THE FIGURES

FIG. 9 illustrates an example user interface of the data exploration tool displaying one or more services.

DETAILED DESCRIPTION

Figure 1:
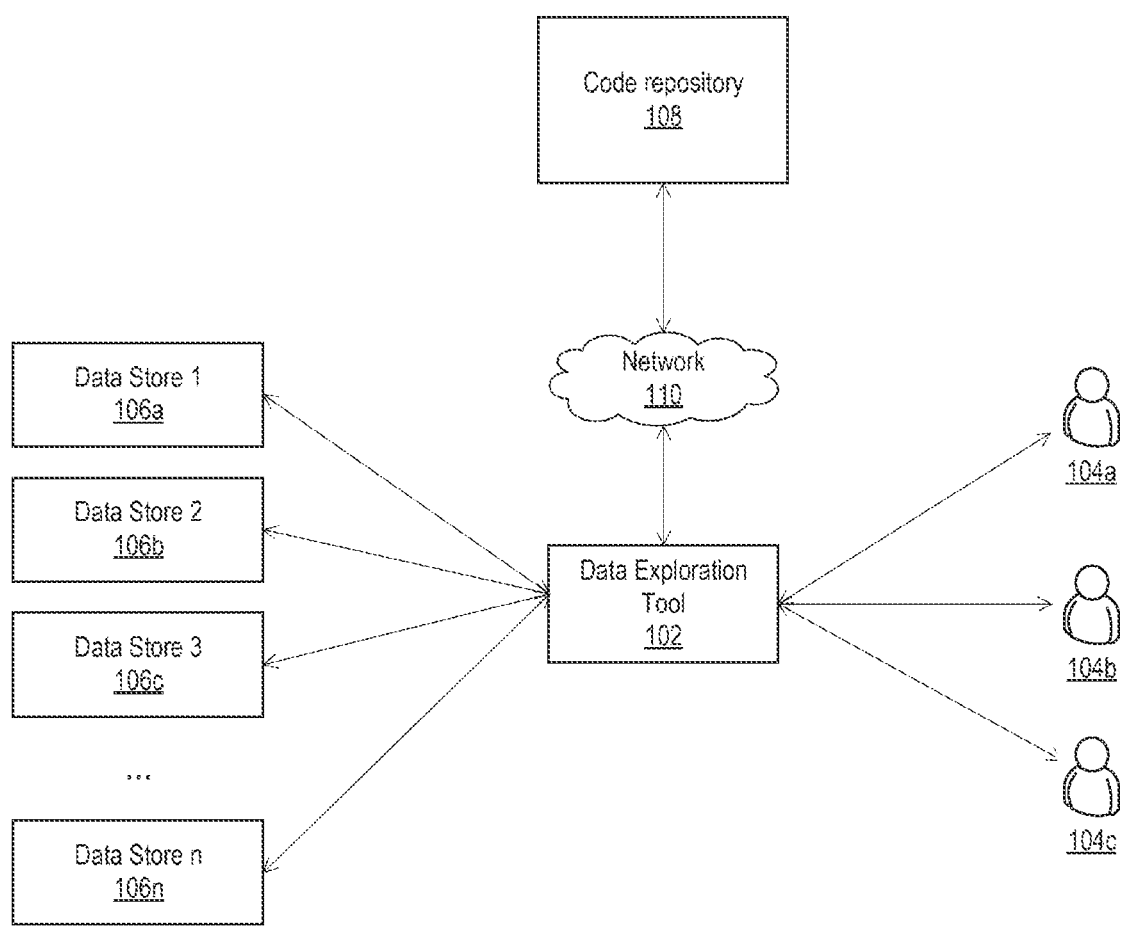
FIG. 1 illustrates an example enterprise environment for the disclosed data exploration solution.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the subject matter of this disclosure relates to a data exploration tool. Entities that handle large amounts of data need to be able to 1) access data, 2) blend, prepare, and clean data, 3) mine and analyze data for insights, 4) automate key parts of the data movement & reporting tasks, and 5) ultimately visualize/report on your data. Currently, there are a wide range of tools in the market to achieve these activities. However, they are disparate, often complicated and are disconnected from each other. For example, entities may use data storage platforms to store data, data movement platforms to move data in and out of the data storage platform and a visualization/reporting layer to create visual representations of the data. However, a tool to analyze and manipulate the data set within the data science workflow is currently lacking.

The disclosed application relates to a tool by which a user may create a cloud workspace via a Docker container that includes a data memory space, as well as a tool for automatically identifying ad-hoc analyses on the data. The disclosed solution allows a user to connect to data sources using SQL or GUI tools, combine data from multiple different data sources, prepare and clean the data, explore and mine the data for insights, and move the data into downstream reporting tools for visualization. The disclosed system may be linked to a GitHub repository to allow data scientists to execute code from GitHub in trial data spaces, investigate the data, and prepare in-depth analytics for downstream reporting tools.

FIG. 1 illustrates an example enterprise environment 100 for the disclosed data exploration solution. The data exploration enterprise environment includes a data exploration tool 102. In some examples, the data exploration tool 102 can be instantiated within a cloud container.

The data exploration tool 102 may include a user interface that can be accessed by one or more end users 104 (104a, 104b, 104c, etc.). The end users may include business analysts and data scientists among others. In some examples, the needs of the different types of end users 104 may vary and the data exploration tool 102 may be configured to meet the different needs of the end users 104. For example, data scientists may need to obtain and perform in-depth investigations on heterogeneous datasets stored in heterogeneous data stores in order to detect relationships among data that is scattered across different departments within an organization. On the other hand, business analysts may require simply to review datasets for trends and create visual representations of the datasets. Therefore, the business analysts may require a simple interface with emphasis on graphical assistance in connecting to underlying datastores and obtaining the required data. The data exploration tool 102 may meet the needs of both types of end users 104 as explained in further detail in relation to FIG. 2.

In some examples, the data exploration tool 102 is communicatively connected to one or more data stores 106 (including 106a, 106b, 106c . . . 106n). The data stores 106 may be heterogeneous databases storing disparate heterogeneous data. In some examples, the plurality of data stores 106 may be maintained by different departments within an organization to store data. In some examples, the data exploration tool 102 may access the plurality of heterogeneous data stores 106 through a network connection to retrieve data related to a user query as described in further detail in relation to FIG. 2.

In some examples, the data exploration tool 102 may be communicatively connected to a code repository 108 over a network 110. The network 110 is an electronic communication medium that facilitates communication between multiple different devices. The network 110 can include links between multiple computing devices and can include a variety of different kinds of hardware (e.g., routers, hubs, servers, etc.) or software to connect the devices. The network 110 can vary in scope and configuration. In some examples, the network 104 is a local area network, a wide area network (e.g. the Internet), or an intranet, among others.

The code repository 108 may be a web-based platform for managing source code for a plurality of code developers. For example, code developers may use code repository 108 to retrieve, modify, check-in, store and execute scripts. In the disclosed example, the code repository 108 may be used to manage scripts related to retrieval, analysis and presentation of data and is described in further detail in relation to FIG. 2.

Figure 2:
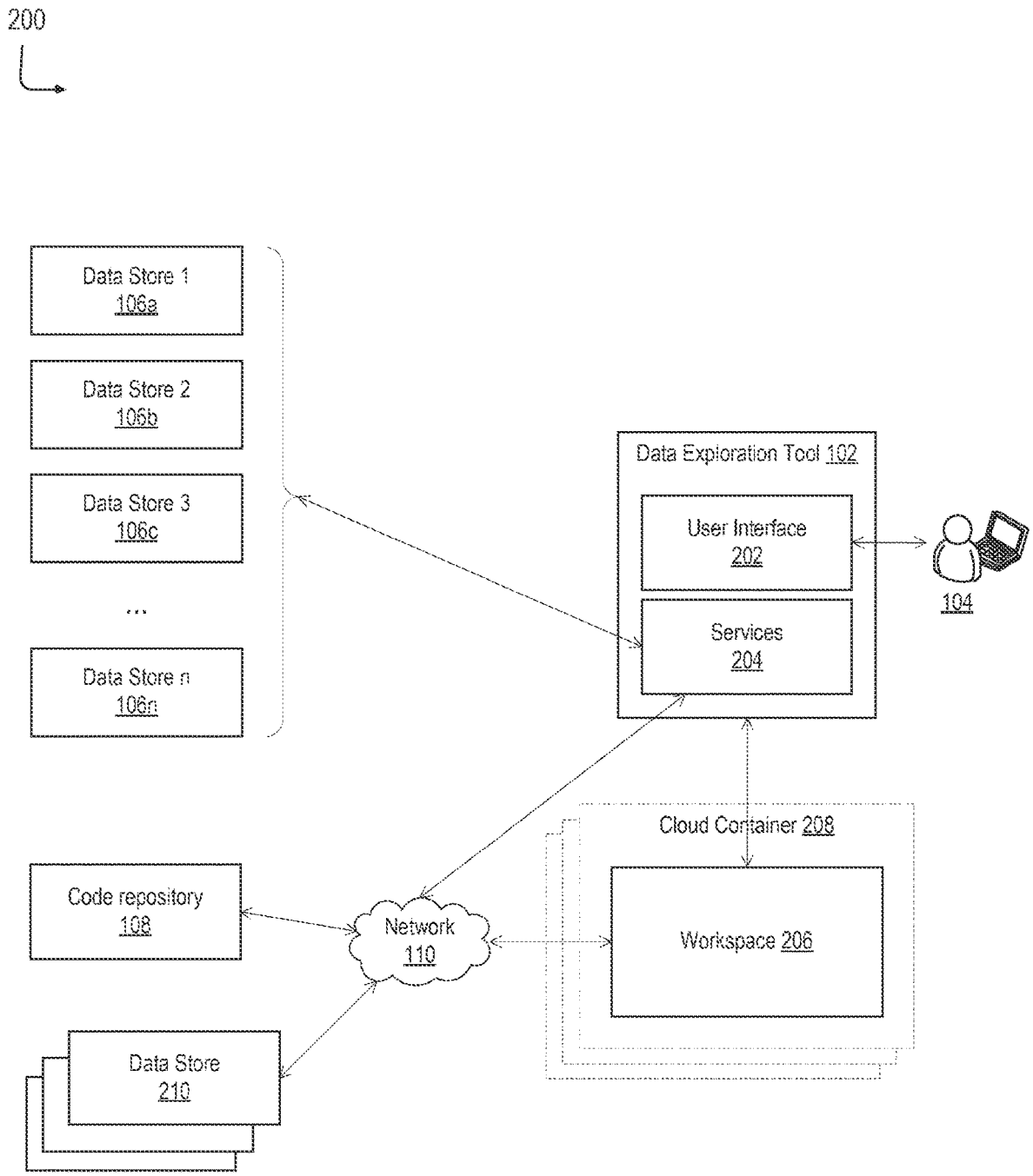
FIG. 2 illustrates an example architecture of the data exploration enterprise.

FIG. 2 illustrates an example architecture 200 of the data exploration enterprise. Some examples of the architecture 200 includes the data exploration tool 102 communicatively connected to a plurality of heterogeneous data stores 106 as described in relation to FIG. 1. The data exploration tool 102 includes a user interface 202 that an end user 104 can access when using the data exploration tool 102. The user interface 202 of the data exploration tool 102 may include a query pane and a results pane. The query pane is configured to receive a query related to data exploration or analysis from the end user 104. Once a query is received from the end user 104, the data associated with the query is retrieved from the one or more data stores 106 and returned back to be temporarily stored and analyzed using the data exploration tool 102. In some examples, the results pane from the user interface 202 is used to illustrate records returned from the plurality of heterogeneous data sources 106 in response to the databased query received from the end user 104. The user interface 202 of the data exploration tool 102 is further described in relation to FIGS. 5-7.

In some examples, the data exploration tool 102 also includes one or more service 204 that are configured with the process of retrieving and analyzing the data related to the user query. In some examples, the services 204 may include a query manager for managing the retrieval of data from the heterogenous data sources 106. Other examples of services that may be used by the data exploration tool 102 may include a data processing and normalization service, an authentication service, a monitoring service, a containerization service, etc. among other data analysis and processing services.

For example, when an end user submits a data query through the user interface 202, the data exploration tool 102 may use a query manager service to retrieve data from the plurality of data stores 106. An authentication service may be used to authenticate the user credentials and access rights before retrieving the queried data. In some examples, the retrieved data can be from different databases and can be formatted differently. Before the retrieved data is stored and presented to the user, the data can be normalized into a single format for easier analysis. For example, a data processing and normalization service can be used to normalize the retrieved data. A monitoring service may also monitor the queries and collect and store meta data and log files related to the queries, which can then be used during data analysis. The services 204 that are used in the retrieval and processing of data may be customized according to the needs of the organization or may include currently-available services such as Logstash, Apache Airflow, Docker, Jupyter, Slack etc.

Upon retrieving the data related to the end user's 104 query from the plurality of data stores 106, the retrieved data may be temporarily stored in a data store 210 that is communicatively connected to the data exploration tool 102. In some examples, the data store 201 may include a containerized database-as-service solution (DBaaS) that allows the data related to the user query to temporarily be stored for faster and easier access, without having to periodically retrieve data from the plurality of data stores 106 each time the data is used. The containerized DBaaS typically runs on a cloud computing platform and access to the database is provided as a service. The DBaaS model provides a scalable, easily accessible and low-cost solution such that application owners need not install, manage and maintain the database themselves. Other solutions of how the data store 210 are configured are also possible.

In some examples the data exploration tool 102 may create a containerized workspace 206 to share, analyze, and process the data retrieved in response to the user query. For example, when a user query is received, a service 204 such as Docker can be used to create a cloud container space 208 to allow users to explore the retrieved data. The cloud container space 208 may include a workspace 206, within it where the user may interact with the retrieved data. The containerized workspace solution allows for a plurality of users to interact with the retrieved data without having to re-write queries each time. In some examples, each query may result in a new containerized workspace 206 to be created with the help of a tool such as Docker. In other examples, separate workspaces 206, each workspace within a cloud container 208, may be created based on the underlying data or user.

In some examples, each containerized workspace 206 may include an SQL client and a Jupyter Notebook. The workspace 206 may be communicatively connected to the code repository 108 and the data store 210 via a network 110. The SQL client may be used to retrieve the query data that was retrieved and temporarily stored within the data store 210. The Jupyter notebook may be a web-based interactive development environment for the user to analyze, explore, generate insights and blend the query data using a plurality of scripts from the code repository 108. The analyzed data may be displayed using visualization tools that are configured as part of the services 204.

In some examples, upon receiving a query from the end user 104 through the user interface 202, the data exploration tool 102 may retrieve the underlying data for the query from the plurality of data sources 106. The retrieved data is processed and normalized with assistance from one or more services 204 and temporarily stored in the data store 210 for easy and quick access. The retrieved data is also displayed on the workspace, which is viewable and accessible by the end user 104 through the user interface 202. The end user 104 may use a Jupyter notebook space within the workspace 206 to analyze, edit, blend, explore, mine and process the query data that is retrieved from the data store 210 as needed. The end user 104 may also access, retrieve and execute a plurality of scripts that are stored in the code repository 108 on the query data that is retrieved from the temporary data store 210. Although the disclosed example discloses using a Jupyter notebook, any other development environment may be used to analyze the data. The end user 104 may use one or more visualization tools to display the analyzed data in a visual format on the user interface 202.

In some examples, the end user 104 may share the workspace, including the query data as well as the scripts used to analyze the data with other users, allowing users to collaborate in developing data insights as a team. For example, an instant messaging service may also be integrated with the data exploration tool to communicate messages regarding the query data with other users on a real-time basis.

In some examples, the data exploration tool 102 may also include one or more persistence module 212 that are configured to retrieve and analyze data, including computing parameters, log files, and query result data, processed with the cloud container 208. The persistence module 212 are described further in relation to FIG. 8.

Figure 3:
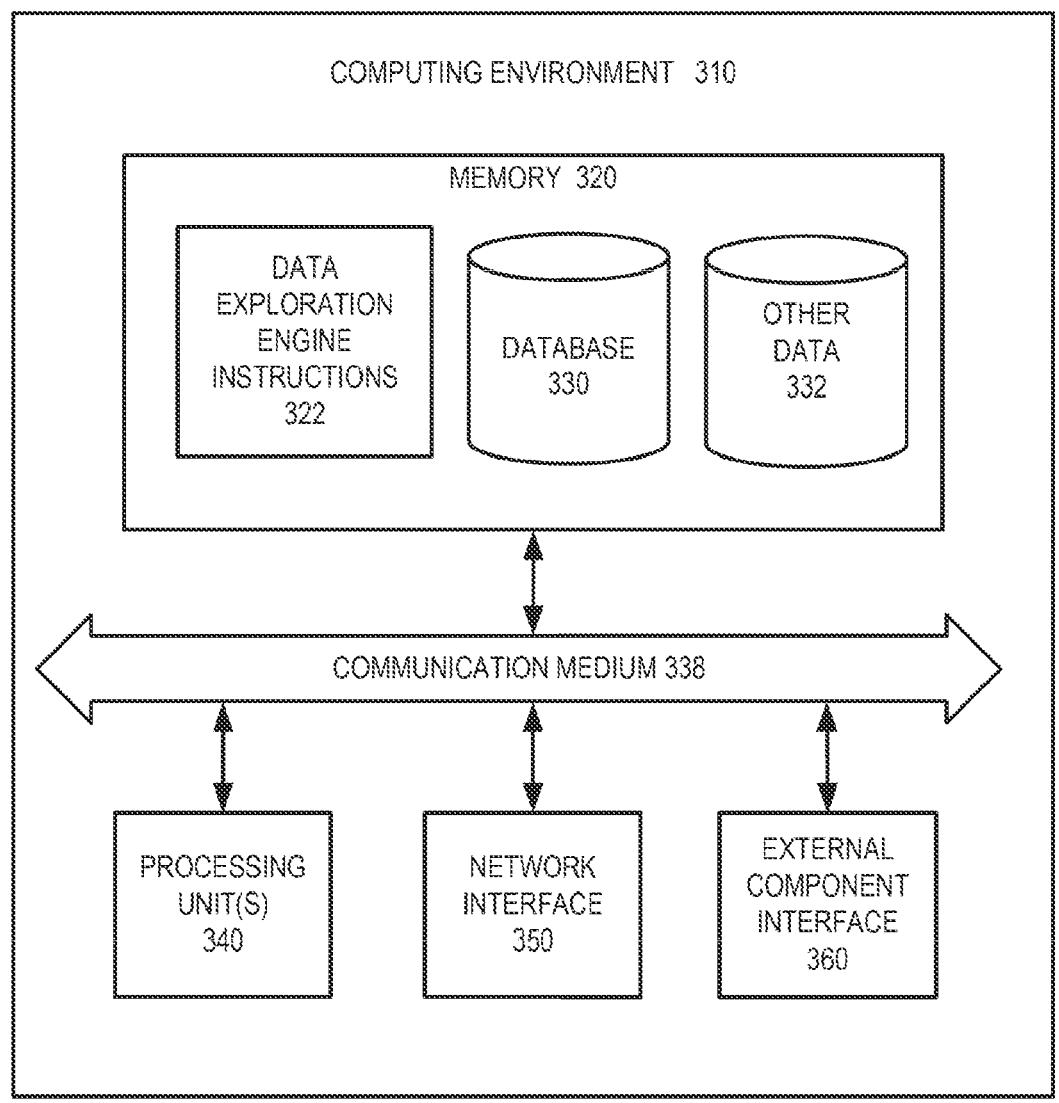
FIG. 3 illustrates an example system with which disclosed systems and methods can be used.

FIG. 3 illustrates an example system 300 with which disclosed systems and methods can be used. In an example, the data exploration tool enterprise 100 as one or more systems 300 or one or more systems having one or more components of systems 300. In an example, the system 300 can include a computing environment 310. The computing environment 310 can be a physical computing environment, a virtualized computing environment, or a combination thereof. The computing environment 310 can include memory 320, a communication medium 338, one or more processing units 340, a network interface 350, and an external component interface 360.

The memory 320 can include a computer readable storage medium. The computer storage medium can be a device or article of manufacture that stores data and/or computer-executable instructions. The memory 320 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 320 can store various types of data and software. For example, as illustrated, the memory 320 includes data exploration engine instructions 322 for implementing one or more aspects of the data exploration enterprise 100 described herein (e.g., as described in relation to FIGS. 1-2), database 330 (e.g., as described in relation to database 106 of FIG. 1), as well as other data 332.

The communication medium 338 can facilitate communication among the components of the computing environment 310. In an example, the communication medium 338 can facilitate communication among the memory 320, the one or more processing units 340, the network interface 350, and the external component interface 360. The communications medium 338 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 340 can include physical or virtual units that selectively execute software instructions. In an example, the one or more processing units 340 can be physical products comprising one or more integrated circuits. The one or more processing units 340 can be implemented as one or more processing cores. In another example, one or more processing units 340 are implemented as one or more separate microprocessors. In yet another example embodiment, the one or more processing units 340 can include an application-specific integrated circuit (ASIC) that provides specific functionality. In yet another example, the one or more processing units 340 provide specific functionality by using an ASIC and by executing computer-executable instructions.

The network interface 350 enables the computing environment 310 to send and receive data from a communication network (e.g., network 110). The network interface 350 can be implemented as an Ethernet interface, a token-ring network interface, a fiber optic network interface, a wireless network interface (e.g., WI-FI), or another type of network interface.

The external component interface 360 enables the computing environment 310 to communicate with external devices. For example, the external component interface 360 can be a USB interface, Thunderbolt interface, a Lightning interface, a serial port interface, a parallel port interface, a PS/2 interface, and/or another type of interface that enables the computing environment 310 to communicate with external devices. In various embodiments, the external component interface 360 enables the computing environment 310 to communicate with various external components, such as external storage devices, input devices, speakers, modems, media player docks, other computing devices, scanners, digital cameras, and fingerprint readers.

Although illustrated as being components of a single computing environment 310, the components of the computing environment 310 can be spread across multiple computing environments 310. For example, one or more of instructions or data stored on the memory 320 may be stored partially or entirely in a separate computing environment 310 that is accessed over a network.

Figure 4:
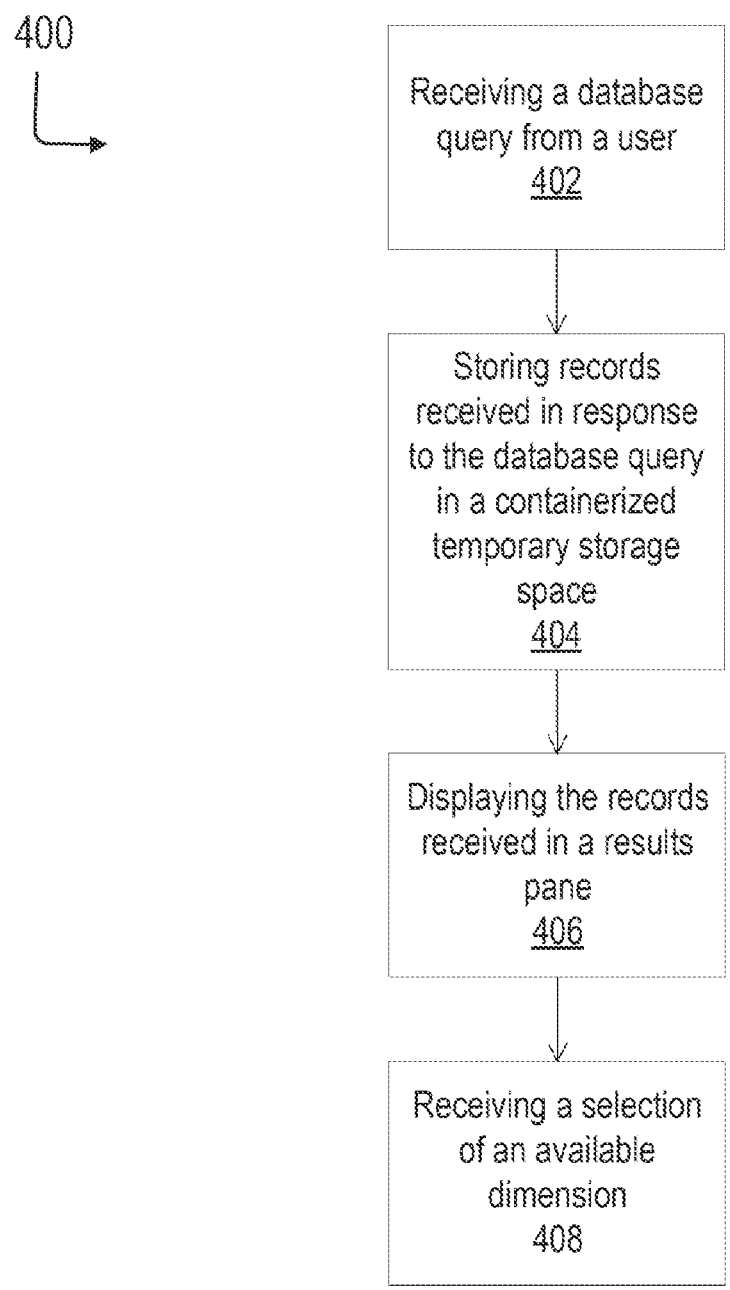
FIG. 4 illustrates an example process of analyzing enterprise data.

FIG. 4 illustrates an example process 400 of analyzing enterprise data. In some embodiments, in operation 402, the data exploration tool 102 may receive a database query from an end user 104. The user may submit the query through a query pane on a user interface 202 of the data exploration tool 102. The database query submitted by the end user 104 may be associated with retrieving data from a plurality of different underlying data sources 106.

In an example operation 404, the data received from one or more data stores 106 in response to the database query is stored in a temporary data store 210. The temporary data store may be within a cloud container. In some examples, the data store 210 may be a database as a service (DBaaS) solution, which minimizes the management and maintenance costs related to the data store 210. Storing the data in a containerized data store 210 allows for quick and easy access to the relevant data while performing analysis on the retrieved data.

In example operation 406, the data retrieved as a response to the database query and stored in a containerized temporary data store 210, is displayed in a results pane of the user interface 202 of the data exploration tool 102. Displaying the records related to the database query on the user interface 202 allows the end user 104 to access and interact with the data and perform additional operations on the data.

In example operation 408, the records from the database query is received in an analysis interface on the user interface 202. The received records may be presented to the user on a scorecard or dashboard. A scorecard may be a summarized view of the organization's performance and may be used by organizations to measure various performance metrics and easily identify areas of the organization that needs improvement. A dimension selection panel within the analysis interface allows users to select portions of the records to be presented on a scorecard. For example, the dimension selection panel may be used to select portions of the retrieved records to be included within available dimensions on the score card. In some examples, the portions of the records may be presented as data columns on the scorecard. In other examples, portions of the records may be used as data filters. Other examples are also possible.

Figure 5:
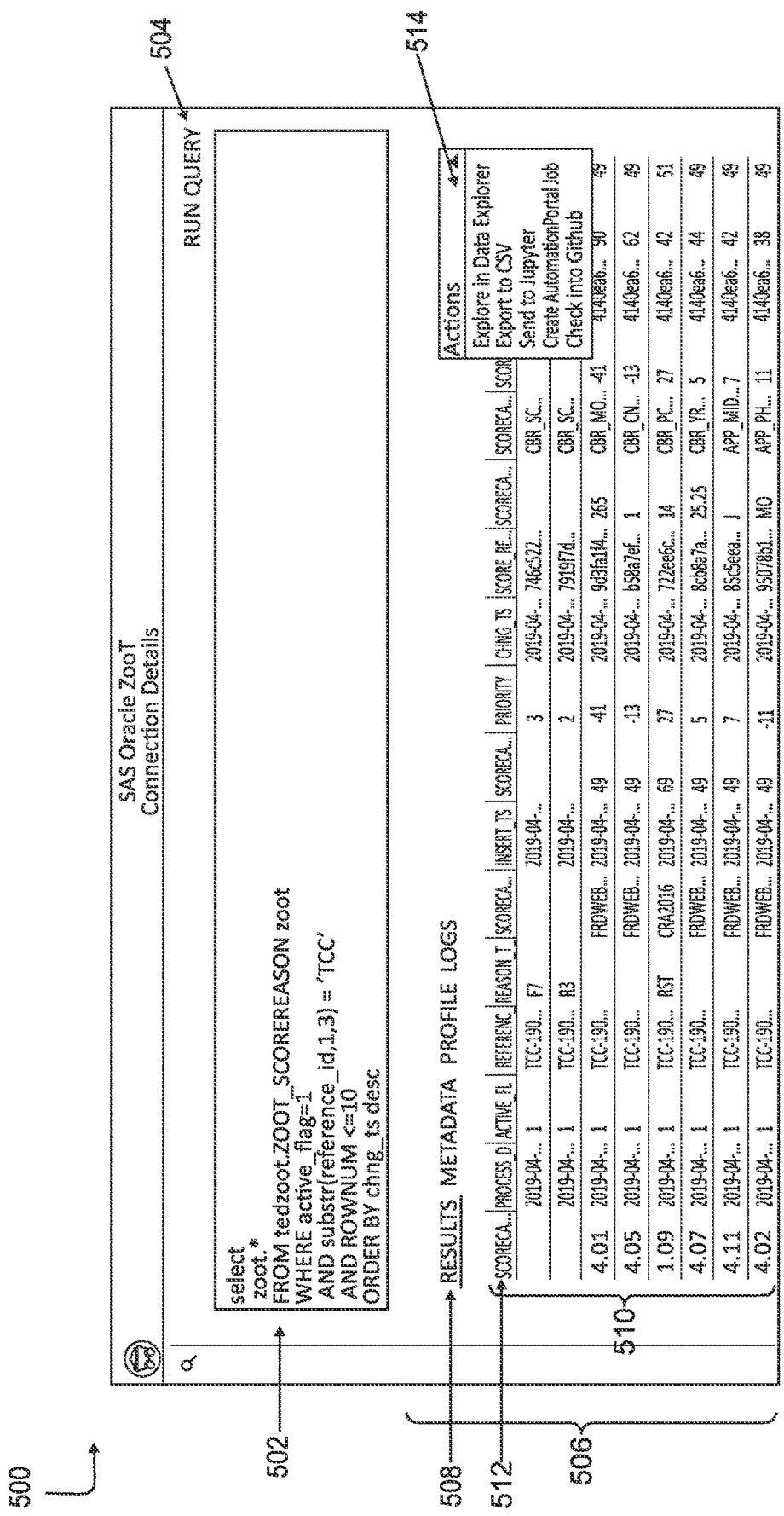
FIG. 5 illustrates an example user interface of the data exploration tool.

FIG. 5 illustrates an example user interface 500 of the data exploration tool. The example user interface 500 illustrates a query pane 502 where the user 104 may enter a database query to retrieve data. Typically, a database query includes instructions to retrieve one or more records from one or more databases according to the criteria included in the query. Upon entering a database query, the user may select a "Run Query" option 504 adjacent to the query pane 502. In some examples, the "Run Query" option 504 may be a button that can be selected by the user by clicking on the button. Other ways of presenting a "Run Query" option to user are also possible.

Upon a user 104 entering a database query within the query pane 502 and selecting the "Run Query" option 504, the data exploration tool executes the database query. In some examples, executing a database query includes retrieving records from one or more databases 106 as specified in the query. The resulting records that are retrieved in response to the execution of the database query can be illustrated on a results pane 506 of the data exploration tool 102.

The results pane 506 may include different tabs or pages 508 to display different types of information related to the database query. In some examples, the tabs or pages 508 include a "Results" tab or subpage, a "Metadata" tab or subpage, a "Profile" tab or subpage and a "Logs" tab or subpage. Each of the tabs and subpage may be viewed by the user by clicking on the tab or subpage name. Other types of tabs or subpages 508 and other ways of accessing each of the tabs or subpages are also possible.

In some examples, selecting the "Results" tab may result in a display of the underlying records related to the database query. In some other examples, selecting the "Metadata" tab may result in a display of the metadata that is collected by a monitoring service configured within the services 204 and stored in the data store 210 each time a query is executed. Metadata related to a query may include data related to time taken to execute the query, date and time when the query was executed, the username of the user that executed the query, and other peripheral information related to the database query. In some examples, selecting the "Profile" tab may result in the display of the profile of the user executing the database query. In some other examples, selecting the "Logs" tab may result in the display of the logfiles related to the database query. Other types of tabs or pages 508 are also possible. Other data may also be collected and displayed upon the selection of one or more of the tabs and subpages 508.

In some examples, the resulting records retrieved in response to the database query may be displayed as a pivot table 510 under the "Results" tab. For example, the resulting records may be displayed as a pivot table 510 wherein the pivot table 510 includes columns of data with column headings 512 that describes the underlying data. Each column of data represents a dimension of data that can be further explored using an explorer pivot pane described further in relation to FIGS. 6 and 7. Other ways of displaying the resulting records is also possible Further, the results pane 506 may also include an option to select one or more "Actions" 514. In some examples, the "Actions" option 514 may be drop down menu that includes a plurality of options from which the user may select an action to execute. For example, the "Actions" option 514 may include the following actions: explore in data explorer, export to CSV, send to Jupyter, create automated portal job, and/or check into Github. Other "Action" options 514 are also possible.

Figure 6:
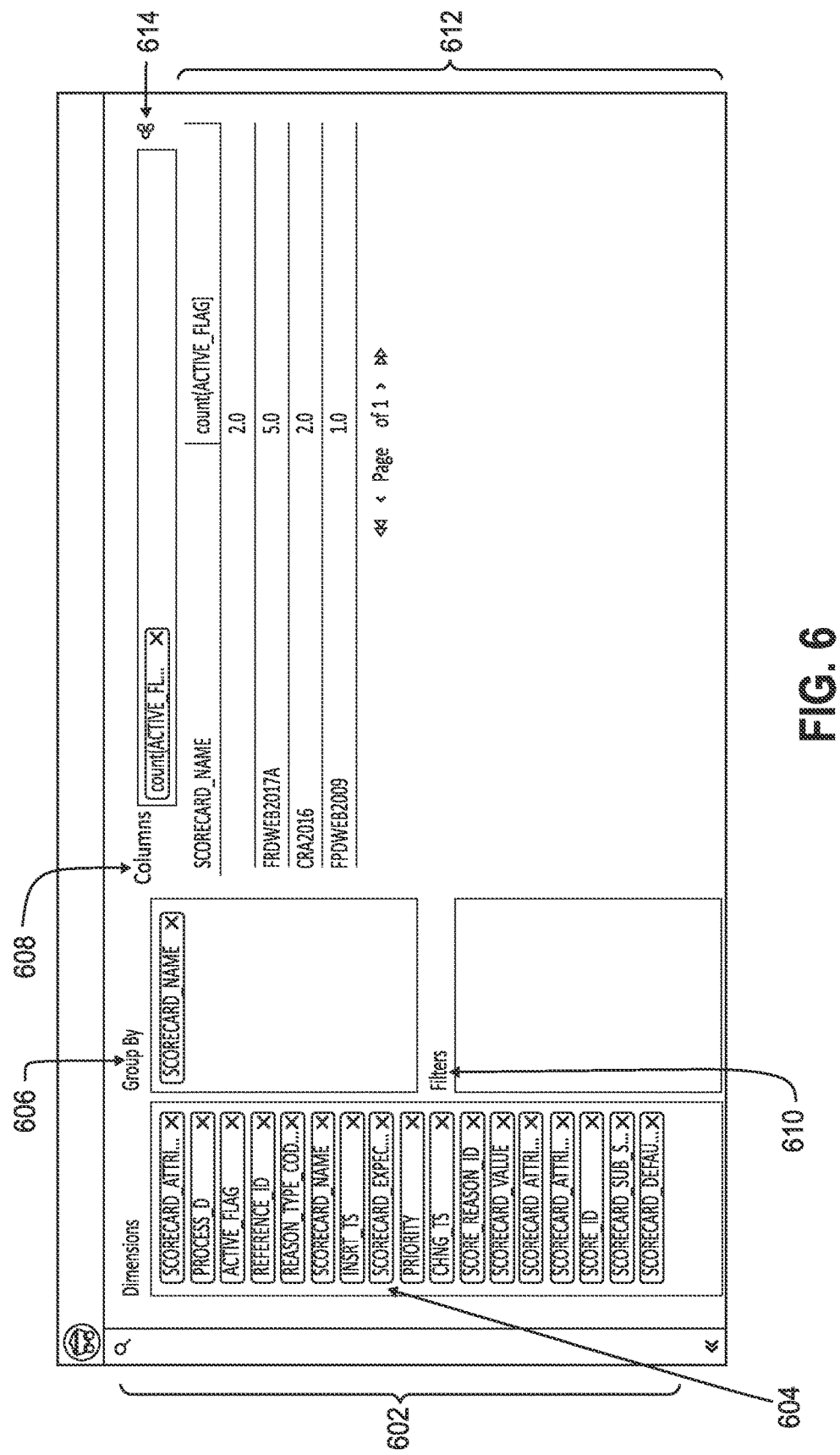
FIG. 6 illustrates another example user interface of the data exploration tool.

FIG. 6 illustrates another example user interface 600 of the data exploration tool. The example user interface 600 illustrates an analysis interface, including a dimension selection pane 602, a group by pane 606, a columns pane 608, a filter pane 610 and a results pane 612. The analysis interface allows users 104 to explore the data retrieved as a result of the database query. For example, the retrieved data may be grouped together as dimensions of data based on different categories as represented in the pivot table 510 from FIG. 5.

In some examples, the analysis interface receives the available dimensions of data 604 and presents each dimension of data as a user selectable graphical element within the dimension selection panel 602. For example, in the disclosed user interface from FIG. 5, the pivot table 510 includes columns of data with column headings 512. Each one of the column headings is categorized as a dimension of data 604 and listed as a graphical element within the dimension selection panel 602 of the example user interface 600. The dimension pane 602 lists all available dimensions of data that can then be used by the user to explore and analyze the underlying data. The user 104 may select one or more available dimensions 604 from the dimension selection panel 602 and drag and drop the selected dimension(s) into other panes within the analysis user interface 600 to update what is viewed within the results pane 612. Other examples of how the user can interact with and select dimensions of data for analysis are also possible.

In some examples, the group by pane 606 allows the user to group and view the data that is associated with the dimensions included within the group by pane 606. The columns pane 608 allows for the user to add one or more additional dimensions of data to be viewed as additional columns of data that are also grouped together based on the dimensions included within the group by pane 606. The filters pane 610 may be used to filter the data displayed within the results pane 612 based on data type or value. The filter pane 610 is further described in relation to FIG. 7. The data retrieved based on the user's database query may be processed according to the user preferences from the group by pane 606, column pane 608 and filters pane 610 and displayed within the results pane 612. Other types of panes and other ways of processing the data are also possible.

For example, in FIG. 5, the third column of data and the sixth column of data from the left includes data related to ACTIVE_FLAG and SCORECARD_NAME respectively, as represented by the column headings 512 at the top of the columns. In the example analysis user interface 600, the dimension selection pane 600 may include ACTIVE_FLAG and SCORECARD_NAME as two of the dimensions of data 604. Upon the user selecting and dragging the SCORECARD_NAME dimension into the group by pane 606, the results pane 612 may be populated with data associated with the SCORECARD_NAME. Additionally, when the ACTIVE_FLAG dimension is selected and moved into the columns pane 608, the results pane 612 is updated with the data associated with the ACTIVE_FLAG as an additional column of data. In some examples, the user may apply additional functions to the data from the data column pane 608. In the disclosed example, the user has included a "count( )" function to the ACTIVE_FLAG data in the column pane 608. Other functions are also possible.

In some examples, the analysis use interface 600 may include a share option 614. Upon selecting the share option 614, the analysis user interface 600, as it appears at the time the share option 614 is selected, can be shared with one or more secondary users. For example, by using the share option on the analysis user interface 600, the user 104 need not separately share the database query information or the configurations of the dimensions pane, 602, the group by pane 606, the columns pane 608, or the filters pane 610 with the one or more secondary users in order for the one or more secondary users to recreate the analysis. In other words, the share option 614 allows users to share their analysis setup and the secondary users can immediately view, edit and contribute to the analysis without having to recreate the analysis or retrieve the same data.

Figure 7:
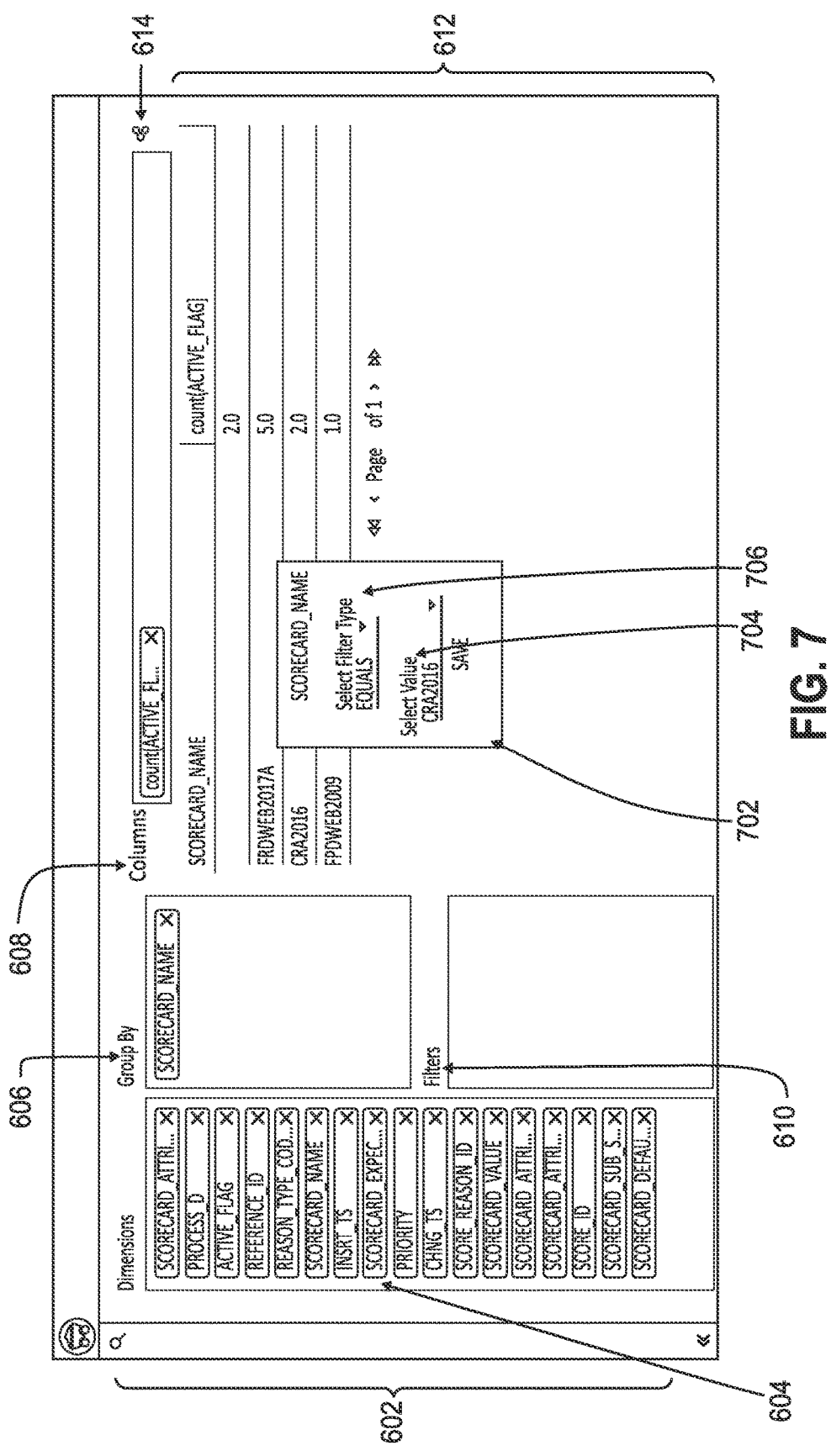
FIG. 7 illustrates an example user interface of the data exploration tool.

FIG. 7 illustrates an example user interface 700 of the data exploration tool. The example user interface 700 illustrates the execution of the filter option from the filter pane 610 of the analysis user interface 600. As described in relation to FIG. 6, the filter pane allows the user to further analyze the retrieved data by executing one or more functions on the data that may be displayed on the results pane 612. In the disclosed example, the results pane is populated by two dimensions of data including the SCORECARD_NAME and the ACTIVE_FLAG. As seen in the results pane 612, the displayed dimensions are further grouped by the values of the SCORECARD_NAME and a count( ) function is applied to the ACTIVE_FLAG data. In the present example the filters pane 610 allows the user 104 to further process the data displayed within the results pane 612 using one or more functions. For example, selecting the filters pane 610 may open a separate window 702 with an option to select the filter type 704 and select a filter value 706. In the present example, the SCORECARD_NAME dimension may be filtered using the filter type 704 "EQUALS" and filter value 706 "CRA2016." Thus, the data displayed on the results pane 612 may be further filtered to only display data rows that are equal to the value "CRA2016." In some examples, the filter type 704 and filter value 706 are selectable from a drop-down menus. Other method of providing filter options are also possible.

Figure 8:
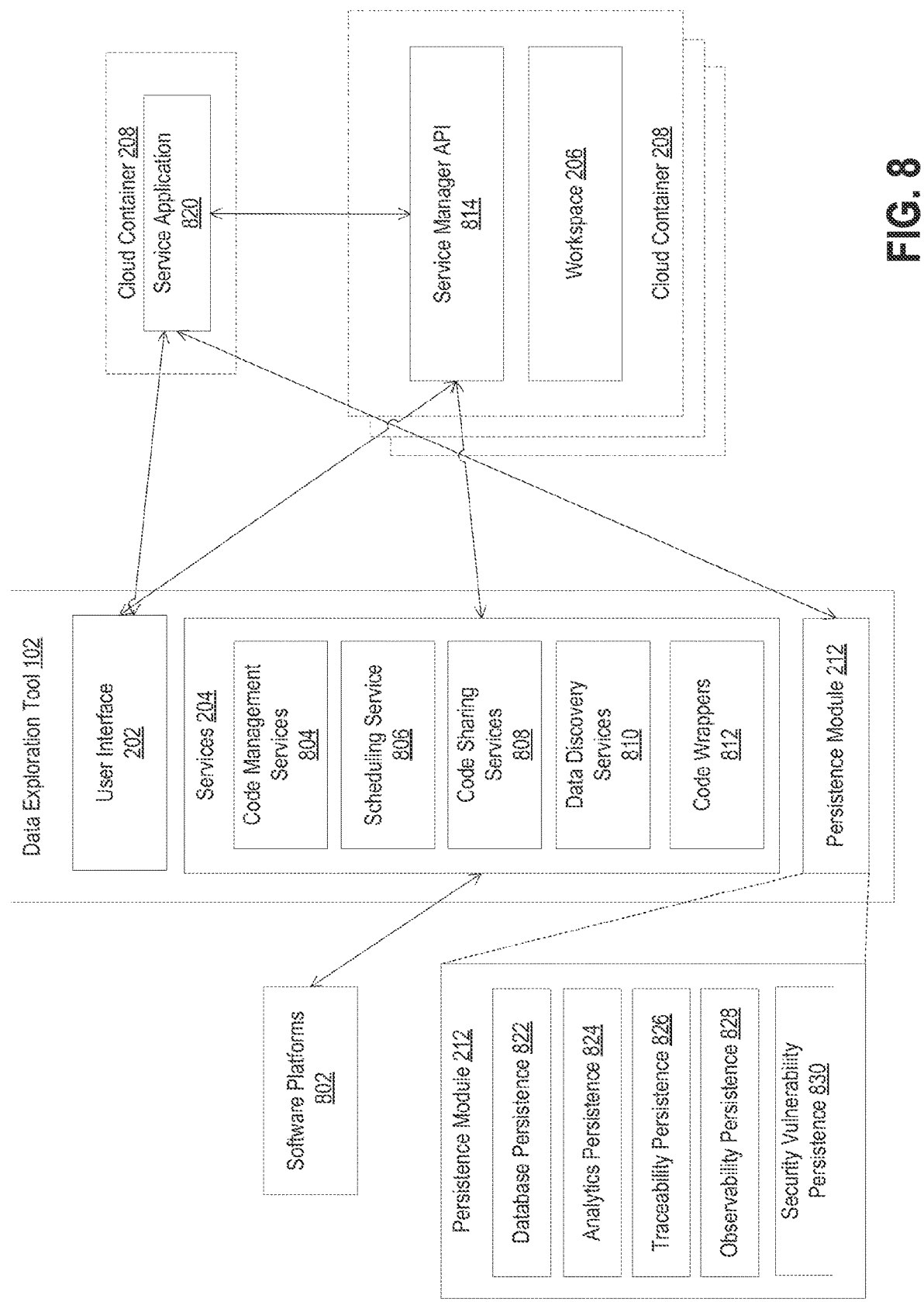
FIG. 8 illustrates an example configuration of the services of the data exploration tool.

FIG. 8 illustrates an example configuration of the services 204 and persistence services 212 of the data exploration tool 102. As described above in relation to FIG. 2, the one or more services 204 can be configured with the process of retrieving and analyzing data from one or more data sources 106 in response to a user query. Further, for example, when a user query is received, a service 204 such as Docker can be used to create a cloud container space 208 to allow users to explore the retrieved data. The cloud container space 208 may include a workspace 206, within it where the user may interact with the retrieved data. The containerized workspace solution allows for a plurality of users to interact with the retrieved data without having to re-write queries each time.

In some examples, in addition to being configured to retrieve data in response to user queries, the data exploration tool 102 can offer access to software service tools embedded within the services 204 that allows the enterprise to administer and manipulate the service itself. In some examples, the "enterprise" includes system administrators that manage the data exploration tool 102 for the end users such as data scientists and business analysts. The services 204 may also include one or more administrative options that provide increased visibility into the software service tools.

In some examples, the customized tools can include software tools, such as open source software service tools, related to processing and analysis of data. Instead of end users having to install and run one or more data processing and analysis software tools on their local computing devices, the software service tools can be hosted as a service in a computing environment 310 associated with the data exploration tool 102 and made available for use by the end users within each of the cloud container 208.

In some examples, the hosting of the software service tools centrally allows for the enterprise to perform user services such as updates, diagnostics, maintenance, etc., related to the software service tools without each user having to perform tool related management functions and software service tool configurations manipulation locally. In other examples, the hosting of the tools as a service allows for the enterprise to extend and expose management features and configurations related to the software service tools that allows for the enterprise to gain greater insight into the end users' log files or manipulate settings on the software service tools that is then applied to all users of the data exploration tool 102.

For example, the backend administrative management of the software service tools provides the enterprise the ability to not only administer the software service tools but also reconfigure the software service tools based on end user setup preferences and run ad hoc scripts to improve the look and feel of the software services tools. In some examples, the software services tools can be restructured or configured while also being available for use by the end users.

In some examples, the data exploration tool 102 may host one or more data analysis and management tools or software platforms 802 and configure the software platforms 802 as services. In some examples, the software platforms 802 may include open source software platforms that are associated with data analysis and management, such as Hadoop, Cassandra, Elasticsearch, PostgreSQL, MongoDB, InfluxDB, Druid, Oracle, etc. In other examples, the software platforms 802 can include other types of software platforms that are internal to the enterprise or sourced from a third-party.

In some examples, the configured services 204 may include code management services 804, scheduling services 806, code sharing services 808 and data discovery services 810. The configured services 204 may also include one or more code wrappers 812 that allow the data exploration tool 102 to interface with the one or more software platforms 802 and centrally host the software platforms 802 as services for users of the data exploration tool 102. In yet other examples, other types of services 204 are also possible.

In some examples, the code management services 804 can include access to a central code repository tool such as a GitHub repository. The scheduling services 806 allows the user to schedule resources, planning the execution of distributed applications and governing the allocation of jobs associated with the distributed applications.

In some examples, the code sharing services 808 allow users to share and collaborate with other users. For example, a user may make a data request and manipulate the received data to generate metrics associated with the data. The user can then share not only the generated metrics, but also the code to generate the metrics with other users using one of the code sharing services that are embedded within the same cloud container 208 where the user is also analyzing the received data.

In some examples, the data discovery services 810 can be configured to allow users to access meta data associated with queried data, which can lead the user to discover data insights that may otherwise be difficult to identify.

Although only limited types of services 804-810 are illustrated and described in relation to FIG. 8, other types of services can be integrated into the cloud containers 208 to assist users with data manipulation and analysis.

As described above in relation to FIG. 2, the data exploration tool 102 may create a containerized workspace 206 to share, analyze and process data retrieved in response to a user query. For example, upon receiving a user query, a service such as Docker can be used to create a cloud container space 208 that may include a workspace 206 such as a Jupyter Notebook that can be used to execute code and subsequently explore and analyze the retrieved and generated data.

In some examples, the cloud container space 208 may also host the one or more services 204. The cloud container 208 may run a service manager Application Programming Interface (API) 814 that provides access to backend processes associated with the one or more services 204 hosted by the cloud container 208.

For example, in the disclosed example, the backend processes associated with the one or more services 204 can include, but are not limited to: access to personalization configurations associated with the one or more services 204, access to code repository services such as GitHub for code management, access to metadata and log files associated with the services for data discovery, access to automation services for reoccurring analysis and access to code sharing services for easy collaborations among the users.

In addition to these backend processes, the service manager API 814 can allow access, via a user interface 202, to intervene in execution of code within workspace 206. For example, in the event of a long-running workload within the workspace 206, a user may utilize one or more tools of user interface 202 to interact with the service manager API 814 to halt execution within workspace 206, delete large files that may have been created during execution, and/or restart workloads. In some examples, a separate service application 820 may execute within a different cloud container 208, and may interact with service manager API 814. The service application 820 may be used in place of the user interface 202, and may present its own user interface for use by an administrative user. Alternatively, the service application 820 may be accessible via user interface 202 for administrative users, as seen in FIG. 8.

In addition to the services 204, the data exploration tool 102 may also include a persistence module 212. As described above, a service 204 such as Docker may be used to create a cloud container 208 to allow users to explore the retrieved data following a user query and may include a service manager API 814 that provides access to backend processes associated with the cloud container 208. However, the cloud container space 208 that is created temporarily to explore the retrieved data and the cloud container space 208, along with all associated data, parameters, configurations and log files, is deleted upon completion of the data exploration process.

The persistence module 212 is configured to retrieve backend process data, including, log files, configurations, and computing parameters as well as raw and processed query result data from the cloud container 208. Once retrieved, the backend process data and/or query result data may be stored or otherwise maintained in a data store for future analysis, such that the retrieved data is accessible and not lost when the created cloud container 208 is deleted upon end of the query data exploration process. The stored data may be retrieved from the data store and one or more services associated with persistence module 212 may use the data to conduct further processing and analysis.

In some examples, the persistence module 212 may interact with the service manage API 814 directly to retrieve backend process data, such as log files, configurations, computing parameters and/or query result data. In some other examples, the persistence module 212 may interact with the service manager API 814 indirectly via a separate service application 820 that may be executed within a different cloud container 208, which may in turn communicate with the end points of the service manager API 814 to retrieve the backend process data and/or query result data. In other examples, users may access, explore and analyze the backend process data and/or query result data associated with one or more cloud containers 208 by interacting with the service manager API via the user interface 202.

In some examples, the persistence module 212 may include one or more persistence services, such as services related to database persistence 822, analytics persistence 824, traceability persistence 826, observability persistence 828, and security vulnerability persistence 830. Other types of persistence services are also possible.

For example, database persistence 822 may include periodically retrieving and storing data associated with the one or more cloud containers 208, including raw query results, processed query results, user setting information, log data files, and any other data associated with cloud container such that if the network connection to the cloud container 208 is severed or the cloud container 208 otherwise crashes, the stored data may be used to recreate the data analysis that was executed prior to the crash of the cloud container 208 without significant data loss.

For example, analytics persistence 824 may include retrieving and/or storing environmental and computing configurations associated with the one or more cloud containers 208 in order to analyze the configurations and to find efficiencies and optimizations in configurations for various infrastructures that the user uses.

For example, traceability persistence 826 may include analyzing historical configuration settings associated with the one or more cloud containers 208 in order to derive insights regarding what types of configuration settings were used to run certain types of query data analysis, what configurations yielded positive/negative results, etc so that the user may recreate a particular cloud configuration as it was during a particular point in time.

For example, observability persistence 828 may include analyzing historical environmental parameters, such as amount of memory and/or processing speed required for certain types of code executions in order derive insights regarding the optimal compute settings for certain types of analysis. For example, computing data may include computing resources, such as amount of memory and/or processing speed required to execute the analysis within the cloud container 208. Based on an analysis of the computing configurations, the user may be able to determine inefficiencies, predict amount of computing resources needed for future analysis, etc.

For example, security vulnerability persistence 830 includes viewing, retrieving, and/or storing data related to the types of executable code that the user brings in from the code repositories in analyzing the query data. Analyzing the types of executable code that the user brings in for use within a cloud container 208 helps determine any executable code that may have caused a security vulnerability. Further, analyzing the types of executable code the user finds useful also allows the enterprise to guide future code development.

FIG. 9 illustrates an example user interface 900 of the data exploration tool displaying one or more services.

In some examples, the data exploration tool 102 may be configured to include, or interact with, a service manager API 814 that can manage and access one or more backend processes associated with the one or more services 204. In other examples, the data exploration tool 102 may also be configured to include a service application 820 that can interact with the end points of the service manager API 814. As noted above, the service application 820 may be maintained within the data exploration tool 102, or may be maintained within a cloud container, for example separately from the various workspaces 206 that may be executing.

In some examples, the user interface of the service application that interacts with the service manager API 814 includes a search bar 902 that allows the user to search for a workload hosted within the cloud container 208. In some examples, the workload can be searched for based on a name or identification associated with the service. In other examples, the owner, type of workload or status of workload can also be used to search for a workload. Other ways of searching for a workload is also possible.

In addition to searching for a workload using the search bar, the workload can also be narrowed down by selecting one or more status indicators 904. For example, the one or more status indicators 904 may include: "active," "deleted," and "failed" indicators. Other types of status indicators are also possible. Each indicator may be associated with a checkbox input that can be selected by the user. Selecting one or more of the listed status indicators 904 selectively lists all services embedded within the cloud container that includes a status that matches the selected status indicators. For example, selecting the "Active" status indicator provides a list of services that are active and available for use. The one or more status indicators 904 may be used in combination with the search bar 902 to further refine the search for a particular type of workload.

In some examples, upon the user executing a search on the search bar 902 and/or selecting a status indicator 904, a list of workloads 906 are displayed for the user to select from. The list of workloads 906 may include the following information for each of the workloads in the list: workload identification (ID), workload name, owner, type of service, date of last modification, and status. Each of the workloads listed in the list of workloads 906 may also include a selectable option that provides additional information regarding the workload and selectable options to restart or delete the service. Other types of information associated with each workload may also be listed in the list of workloads 906.

In some examples, selecting a workload may include clicking on the workload ID or workload name. In other examples, other ways of selecting a workload may also be possible. Upon selecting a workload from the list of workloads 906, the backend processes associated with the selected workload may be exposed. For example, log files tagged with the user identification information, processes running within the workload and configurations associated with the workload can be accessed and manipulated through the example user interface 900. In some examples, the user can execute commands within the workload using a terminal that is accessible through the example user interface 900. Generally, log files may be maintained within each respective workspace 206, such that a user may utilize the user interface 900 to access those log files on an as-needed basis. Since the workspace 206 is largely location-agnostic (i.e., may be placed at any of a variety of locations or in various contexts within an enterprise network), such log files may be maintained in a convenient location within the workspace 206 for access and viewing, rather than storing such log files in a predetermined location external to the workspace 206 and/or related container 208. Rather, use of API 814 allows such access to occur.

Figure 10:
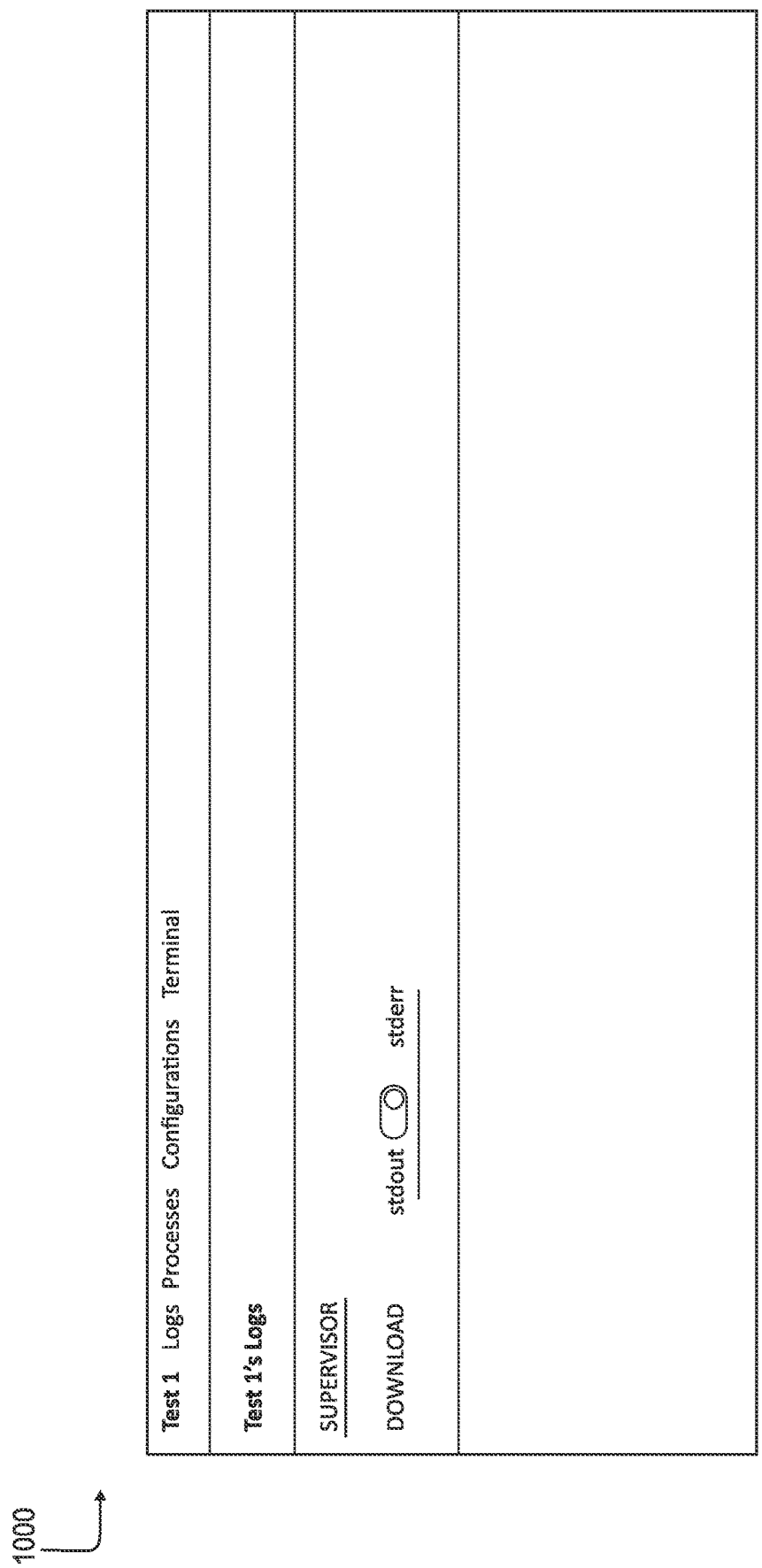
FIG. 10 illustrates an example user interface of the data exploration tool showing a log access service of a service application accessible via the data exploration tool.

FIG. 10 illustrates an example user interface 1000 of the data exploration tool 102 showing a log access service. The log access service may be accessible via a service application, such as service application 820. In a preferred embodiment, the user may access the log files by executing a retrieve command rather than the disclosed system periodically pushing the log files out. In the example shown, the log access tool allows a user to access and download logs generated from a particular workload, for example to view events that occurred as the workload executes and as the data set within the containerized storage space is generated. The user interface 1000 allows a user to access such logs to see potential errors that may have occurred during execution, either within an error log or within an output log. In example embodiments, the user interface 1000 may be presented to any user of the data exploration tool 102, while in particular embodiments the user interface 1000 is limited to access by an administrative or supervisor user.

Figure 11:
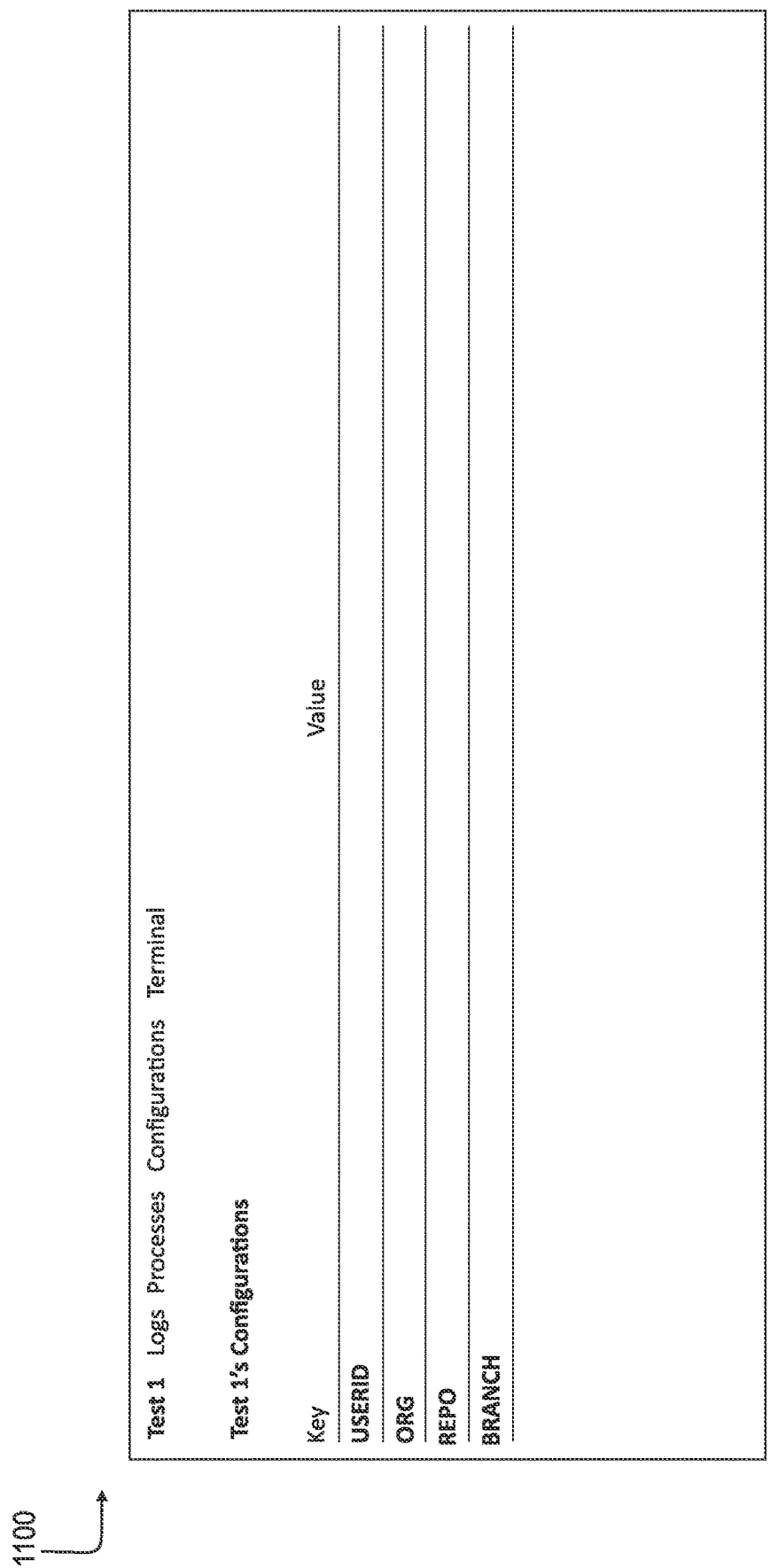
FIG. 11 illustrates an example user interface of the data exploration tool showing configuration data associated with executable code associated with a containerized storage space managed using the data exploration tool.

FIG. 11 illustrates an example user interface 1100 of the data exploration tool 102 showing configuration data associated with executable code. The user interface 1100 presents specific configuration data associated with a particular workload, to display a user ID, organization, as well as a code repository used and branch of that code repository. Accordingly, a user may be able to verify that an appropriate set of code is used to generate query results, in the event data is stored in the temporary storage space within a cloud container 208 that is unexpected to the user.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:
1. A data exploration system comprising:
a computing system including:

one or more processors; and
memory communicatively coupled to the one or more processors, the memory storing instructions for:
a data exploration tool useable to instantiate a containerized temporary storage space and link to one or more code repositories storing executable code including one or more data queries, the temporary storage space being configured to store query results from the data queries, wherein the data exploration tool includes:
one or more data exploration services configured to manipulate the query results in the temporary storage space to create processed query results; and
one or more persistence services configured to retrieve data including at least one of: backend process data, query results and processed query results associated with the temporary storage space, wherein the retrieved data is stored in a data store and used to derive insights associated with at least one of: the one or more data queries and the temporary storage space;
a service application monitoring execution of the code within the temporary storage space, the service application providing a user interface via the data exploration tool to view, interrupt, and initiate execution of the code; and
a containerized workspace created by the data exploration tool to analyze the query results, wherein the containerized workspace is communicatively connected to the containerized temporary storage space and includes:
an interactive development environment instantiated within the containerized workspace, the interactive development environment configured to receive and execute a plurality of analysis scripts from the code repository communicatively connected to the containerized workspace;
wherein the one or more data exploration services of the data exploration tool is communicatively connected to the containerized workspace to enable analysis of the query results on one or more analysis user interfaces within the interactive development environment using one or more of the analysis scripts from the one or more code repositories that are executed from the interactive development environment.

2. The data exploration system of claim 1, wherein the service application executes within a second container separate from the containerized temporary storage space.

3. The data exploration system of claim 1, wherein the service application is accessible via a user interface.

4. The data exploration system of claim 3, wherein the user interface is included within the data exploration tool.

5. The data exploration system of claim 4, wherein the one or more workloads are each executed within a different workspace, each workspace being implemented within a separate cloud container.

6. The data exploration system of claim 4, wherein the user interface presents a plurality of execution modification options to a user, the execution modification options including a restart option and a kill option.

7. The data exploration system of claim 1, wherein the backend process data includes at least one of: configuration settings, computing settings, and log files.

8. The data exploration system of claim 1, wherein the persistence services include at least one of: database persistence, analytics persistence, traceability persistence, observability persistence and security vulnerability persistence.

9. The data exploration system of claim 1, wherein the service application further retrieves the retrieved data from the temporary storage space and causes the retrieved data to be viewed and analyzed via the user interface.

10. The data exploration system of claim 1, wherein the data exploration tool includes an analysis interface including:
a dimension selection panel configured to display each of the available dimensions included in the query results, each of the dimensions being selectable to be applied within a scorecard as one of (1) a data column or (2) a data filter; and
one or more administrative options associated with each of the one or more data exploration services.

11. The data exploration system of claim 1, wherein the data exploration tool includes a data exploration interface including a query pane and a results pane, the query pane configured to receive a data query directed to a plurality of different underlying data sources, the results pane illustrating records returned from the plurality of different underlying data sources in response to the database query received from a user in the query pane.

12. A method of exploring data obtained from queries of a plurality of data sources, the method comprising:
instantiating a containerized temporary storage space;
linking the containerized temporary storage space to one or more code repositories storing executable code that includes one or more data queries of the plurality of data sources;
creating, by the data exploration tool, a containerized workspace communicatively connected to the containerized temporary storage space to enable analysis of the records, the containerized workspace including:
an interactive development environment instantiated within the containerized workspace, the interactive development environment configured to receive and execute a plurality of analysis scripts from the code repository communicatively connected to the containerized workspace;
using one or more data exploration services of a data exploration tool, storing query results within the temporary storage space, communicatively connected to the containerized workspace created by the data exploration tool to enable analysis of the query results on one or more analysis user interfaces within the interactive development environment using one or more of the plurality of analysis scripts from the code repository that is executed from the interactive development environment;
using one or more persistence services of the data exploration tool, retrieving data, including at least one of: backend process data and the query results associated with the temporary storage space, wherein the retrieved data is stored in a data store and used to derive insights associated with at least one of: the one or data queries and the temporary storage space;
accessing a service application that monitors execution of the executable code to display a service user interface presenting code execution status of the executable code and including one or more code execution modification options; and in response to a selection of one of the one or more code execution modification options, modifying execution of the executable code via the service application.

13. The method of claim 12, wherein the one or more code execution modification options includes a restart option and a kill option.

14. The method of claim 12, further comprising accessing the service application via the service user interface to view a log of execution of the executable code.

15. The method of claim 14, wherein the log of execution of the executable code includes a log including at least one of standard out (stdout) and standard error (stderr) logs generated from execution of the executable code.

16. The method of claim 12, wherein the service application is executable within a container that is separate from the containerized temporary storage space.

17. The method of claim 12, wherein the service application is accessible via the data exploration tool.

18. The method of claim 12, further comprising accessing the service application via the service user interface to view a configuration of the executable code.

19. The method of claim 12, further comprising accessing the service application via the service user interface to view a configuration of the executable code.

20. A data exploration system comprising:
a computing system including:
one or more processors; and
memory communicatively coupled to the one or more processors, the memory storing instructions for:
a data exploration tool useable to instantiate a containerized temporary storage space and link to one or more code repositories storing executable code including one or more data queries, the temporary storage space being configured to store query results from the data queries, the data exploration tool including:
one or more data exploration services configured to manipulate the query results in the temporary storage space; and
one or more persistence services configured to retrieve data including at least one of: backend process data, query results and processed query results associated with the temporary storage space, wherein the retrieved data is stored in a data store and used to derive insights associated with at least one of: the one or more data queries and the temporary storage space;
a containerized workspace created by the data exploration tool to analyze the query results, wherein the containerized workspace is communicatively connected to the containerized temporary storage space and includes:
an interactive development environment instantiated within the containerized workspace, the interactive development environment configured to receive and execute a plurality of analysis scripts from the code repository communicatively connected to the containerized workspace on an analysis interface, the analysis interface including;
one or more administrative options associated with each of the one or more data exploration services, wherein the one or more administrative options includes accessing log files associated with the one or more data exploration services;
wherein the one or more data exploration services of the data exploration tool is communicatively connected to the containerized workspace to enable analysis of the query results on one or more analysis user interfaces within the interactive development environment using one or more of the analysis scripts from the one or more code repositories that are executed from the interactive development environment.

\* \* \* \* \*